United States Patent
Du et al.

(10) Patent No.: US 12,204,830 B2
(45) Date of Patent: Jan. 21, 2025

(54) SIMULATION OPTIMIZATION METHOD AND APPARATUS BASED ON TIME PREDICTION

(71) Applicant: Tsinghua University, Beijing (CN)

(72) Inventors: Zhihui Du, Beijing (CN); Chongyu Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1052 days.

(21) Appl. No.: 17/143,513

(22) Filed: Jan. 7, 2021

(65) Prior Publication Data
US 2021/0124860 A1  Apr. 29, 2021

Related U.S. Application Data

(63) Continuation of application No. PCT/CN2019/105131, filed on Sep. 10, 2019.

(30) Foreign Application Priority Data

Dec. 19, 2018  (CN) .......................... 201811552331.0

(51) Int. Cl.
G06F 30/27   (2020.01)
G06N 3/08    (2023.01)

(52) U.S. Cl.
CPC ............... *G06F 30/27* (2020.01); *G06N 3/08* (2013.01)

(58) Field of Classification Search
CPC .......... G06F 2111/10; G06F 2209/501; G06F 2209/5019; G06F 2209/505; G06F 30/27; G06F 9/5016; G06F 9/5077; G06F 9/5083; G06N 3/08
See application file for complete search history.

(56) References Cited

U.S. PATENT DOCUMENTS

2011/0138391 A1*  6/2011  Cho ..................... G06F 9/4881
                                                       718/102

OTHER PUBLICATIONS

Curtarolo, Stefano, et al. "AFLOW: An automatic framework for high-throughput materials discovery." Computational Materials Science 58 (2012): 218-226. (Year: 2012).*

(Continued)

*Primary Examiner* — Nithya J. Moll
(74) *Attorney, Agent, or Firm* — Hodgson Russ LLP

(57) ABSTRACT

Provided in the present invention is a high-throughput material simulation calculation optimization method based on time prediction, relating to the field of materials science. The method comprises: first constructing a prediction model of task configurations and corresponding time predictions, and using the prediction model to generate the execution time of all of the tasks in a high-throughput material simulation calculation under different conditions; then generating an optimal scheduling plan for each model in the high-throughput material simulation calculation by means of directed graphs; and, according to the optimal scheduling plan for each model, sequentially executing all of the tasks until all of the tasks are completed. Further, a high-throughput computing simulation optimization apparatus based on a time prediction and a storage medium are provided.

12 Claims, 1 Drawing Sheet

(56) References Cited

OTHER PUBLICATIONS

Mathew, Kiran, et al. "Atomate: A high-level interface to generate, execute, and analyze computational materials science workflows." Computational Materials Science 139 (2017): 140-152. (Year: 2017).*

Waschneck, Bernd, et al. "Optimization of global production scheduling with deep reinforcement learning." Procedia Cirp 72 (2018): 1264-1269. (Year: 2018).*

Yang, Xiaoyu, et al. "MatCloud: A high-throughput computational infrastructure for integrated management of materials simulation, data and resources." Computational Materials Science 146 (2018): 319-333. (Year: 2018).*

Zhong, Jianlong, and Bingsheng He. "Kernelet: High-throughput GPU kernel executions with dynamic slicing and scheduling." IEEE Transactions on Parallel and Distributed Systems 25.6 (2013): 1522-1532. (Year: 2013).*

WIPO, ISR for PCT/CN2019/105131, Dec. 4, 2019.

* cited by examiner

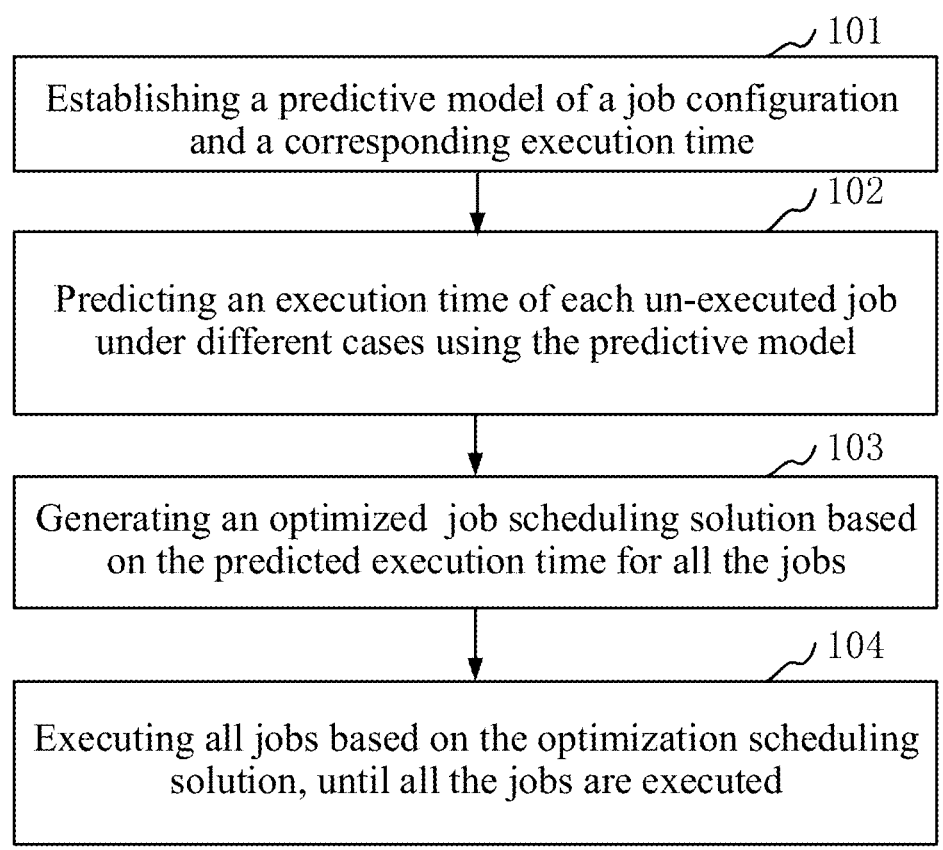

SIMULATION OPTIMIZATION METHOD AND APPARATUS BASED ON TIME PREDICTION

CROSS-REFERENCE TO RELATED APPLICATIONS

The present disclosure a continuation application of PCT/CN2019/105131 filed on Sep. 10, 2019, which claims priority to Chinese Patent Application No. 201811552331.0 filed by Tsinghua University on Dec. 19, 2018, titled with "a high-throughput computational material simulation optimization method based on a time prediction", the entire contents of which are incorporated herein by reference.

TECHNICAL FIELD

The present disclosure relates to a field of computational material information technologies, and more particularly to a high-throughput computational material simulation optimization method based on a time prediction, a high-throughput computational material simulation optimization apparatus based on a time prediction and a storage medium.

BACKGROUND

At present, the acquisition of new material is turned from finding the new material through a huge number of experiments to designing a high-throughput computing paradigm for the new material through a large amount of computational material simulations, which may greatly improve efficiency of acquiring of new material.

High-throughput computation refers to quickly completing a large batch of computation tasks at once by means of powerful computational resource and screening a candidate material design meeting requirements by an analysis on the computational result. Such computation task is presented in a form of a job on a computer system with a high performance, which may be referred to as a high-throughput computational material job. Since such computation task typically causes a huge amount of calculation, it is a challenge to optimize and improve the performance. A current popular performance optimization method is targeted to a single high-throughput computational material job, which has the advantage that as long as the performance can be improved for one job, then the method can have the same optimization effect for other similar jobs. However, such method has a draw back that the optimization is performed starting from local information of a single job without considering the physical relationship between different jobs. That is, a more significant optimization potential which may be caused by an analysis from a macroscopic and overall perspective is ignored, such that the optimization effect is prone to be restricted by various local factors, and the overall optimization performance of the jobs cannot be improved greatly and comprehensively.

The high-throughput computation, in particular the material genome initiative, mainly focuses on realizing an automation procedure of various computational stages. Two typical and well known projects are AFlow and MP developed in US. However, there is a lack of solution of greatly decreasing execution time of the jobs, in particular optimizing the execution time of a large amount of compute-intensive jobs.

SUMMARY

An objective of the present disclosure is to overcome a disadvantage in prior art that it is hard to optimize execution time of a group of compute-intensive simulation jobs, such that a high-throughput computational material simulation optimization method based on a time prediction is provided. Taking advantage of characteristics of high-throughput computational material simulation jobs, an efficiency of executing the high-throughput jobs can be greatly improved, thus greatly decreasing a time required for designing a new material.

A high-throughput computational material simulation optimization method based on a time prediction is provided. The method includes the following steps.

1) Establishing a predictive model of a job configuration and a corresponding execution time. The step has following sub steps 1-1) to 1-3).

1-1) establishing a calculation database of an initial configuration of an executed job in a high-throughput computational material simulation and a corresponding execution time;

1-2) configuring all executed jobs in the calculation database established in sub step 1-1) as a training set, establishing a deep neural network, taking the initial configuration of the executed job, running parameters and a hardware configuration as inputs of the deep neural network and taking the execution time as an output, taking the executed jobs in the training set to perform a supervised learning to obtain a trained deep neural network model;

1-3) selecting M jobs as a testing set, and using the testing set to test the trained deep neural network obtained in sub step 1-2): if a difference between the execution time predicted by the deep neural network for each job in the testing set and an actual execution time of the job is within a preset error threshold, the trained deep neural network obtained in sub step 1-2) is taken as the predictive model: if there is a job whose execution time predicted by the deep neural network has a difference with an actual execution time of the job exceeding the preset error threshold, adding a new executed job in the training set to obtain an updated training set, and returning the sub step 1-2) to use the updated training set to train the deep neural network again;

2) Predicting an execution time of each un-executed job under different cases using the predictive model. The step has following sub steps 2-1) to 2-2).

2-1) inputting all un-executed jobs in the high-throughput computational material simulation into the predictive model to output a prediction value of an independent execution time of each un-executed job;

2-2) for all L un-executed jobs based on a same material structural configuration in the high-throughput computational material simulation, using the predictive model to predict a sharing execution time of each of the L un-executed jobs in a situation of sharing execution information of other jobs in each of different preset sharing execution modes, recording a sharing execution mode having a shortest sharing execution time, and configuring the shortest sharing execution time as a final sharing execution time corresponding to the un-executed job to form a sharing execution time matrix $Q_{L \times L}$, and using a matrix $SH_{L \times L}$ to represent the sharing execution mode having the shortest sharing execution time;

3) For all the L jobs, generating an optimization scheduling solution. The step has following sub steps 3-1) to 3-4).

3-1) representing a set of all un-executed jobs by S;

3-2) constructing a directed graph $G=<V,E>$ based on the sharing execution time matrix $Q_{L \times L}$ and the set S, where $V=S \cup \{r\}$, r represents a new added root node: for $q_{ij} \in Q_{L \times L}$, constructing an edge $<i,j> \in E$ having a weight of $e_{ij}=q_{ij}$: for each job in S, constructing an edge starting from r and having a weight of the independent execution time of the job and adding the edge into E;

3-3) obtaining a minimum covering branch A by performing Edmonds algorithm on G;

3-4) traversing A based on a breadth-first search, and forming a set of parallelizable executing jobs $J_1 \ldots J_k$, where k represents a depth of A and $S=\cup_{i=1}^{k} J_i$, and generating the optimization scheduling solution for all the L jobs;

4) Executing all un-executed jobs based on the optimization scheduling solution generated in step 3), until all the un-executed jobs are executed.

A high-throughput computational material simulation optimization apparatus based on a time prediction is provided. The apparatus includes a processor and a memory having executable instructions and related data stored therein. When the instructions are executed by the processor, the processor is caused to perform the high-throughput computational material simulation optimization method based on a time prediction described above.

A non-transient storage medium having instructions stored therein is provided. When the instructions are executed by a processor, the processor is caused to perform the high-throughput computational material simulation optimization method based on a time prediction described above.

The present disclosure has following features and advantages.

(1) The optimization is realized by analyzing an intrinsic physical relationship between multiple simulation jobs in the high-throughput computational material simulation, which is an optimization method based on overall jobs, and different from an idea of traditional performance optimization methods for a single job. The current local optimization method for the single job may be combined with the method without being affected. The local optimization method and the method provided in the present disclosure present a complementation and superposition relation.

(2) The optimization method provided in the present disclosure has a significant overall effect, i.e., the performance for most jobs can be significantly improved. The efficiency of executing the high-throughput job can be improved greatly, thus significantly decreasing the time required for designing the new material.

(3) The method realizes the optimization by considering effects of all jobs, thus has a significant effect compared to the method of only considering relationships between some jobs.

BRIEF DESCRIPTION OF THE DRAWINGS

In order to clearly illustrate technical solutions of embodiments of the present disclosure, a brief description of drawings used in embodiments is given below: Obviously, the drawings in the following descriptions are only part embodiments of the present disclosure, and for those skilled in the art, other drawings can be obtained according to these drawings without creative labor.

FIG. 1 is a flowchart of a high-throughput computational material simulation optimization apparatus based on a time prediction according to an embodiment of the present disclosure.

DETAILED DESCRIPTION

The present disclosure provides a high-throughput computational material simulation optimization method based on a time prediction, which will be described in detail below in combination with specific embodiments.

A high-throughput computational material simulation optimization method based on a time prediction is provided. Assume that one high-throughput computing simulation (HTCS) is consisted of M models, which can be expressed by $$HTCS = \cup_{i=1}^{M} Model_i \quad (1)$$

M represents a number of high-throughput computational material models. $Model_i$ represents an $i^{th}$ model.

The $i^{th}$ model is consisted of Ni jobs, such that $Model_i$ may be further expressed by $$Model_i = \cup_{j=1}^{N_i} S_{i,j} \quad (2)$$

$S_{i,j}$ represents a $j^{th}$ job of the $i^{th}$ model.

Different jobs for a same model are different in mingled elements but the same in other aspects.

How to compute and optimize the job will be explained below based on a widely used VASP software. Here, two execution modes of the high-throughput jobs are defined, including an independent execution mode and a sharing execution mode.

The independent execution mode refers to that the job is performed on a concurrent computational system based on INCAR, POSCAR, POTCAR and KPOINT input documents generated independently for the job when designing the job, and has no relation with other jobs.

The sharing execution mode refers to two jobs A and B. A represents an executed job and B represents a job to be executed. A running efficiency of B is optimized by sharing execution results of A. There are three different sharing execution modes, including a sharing CONTCAR execution mode, a sharing CHGCAR execution mode, a sharing CONTCAR and CHGCAR execution mode. The CONTCAR execution of A shared with B refers to that POSCAR of B generated in an initial design stage is replaced with CONTCAR obtained after executing A. the CHGCAR execution of A shared with B refers to that B uses CHGCAR outputted by A as an additional input document to obtain a charge distribution, which requires to modify an original INCAR document at the same time by setting ICHARG to 1. The CONTCAR and CHGCAR execution of A shared with B refers to that B not only uses CONTCAR of A as POSCAR, but also uses CHGCAR of A as the additional input document to obtain a charge distribution and further sets ICHARG in INCAR document to 1. The three sharing execution modes have different effects varying with different jobs.

A concept of "adjacent elements" is defined below: For two elements EA and EB in the periodic table of elements, if they are located at a same row in the periodic table of elements and directly adjacent to each other, then the two elements are referred to as adjacent elements in row: if they are located at a same column in the periodic table of elements and directly adjacent to each other, then the two elements are referred to as adjacent elements in column. Regardless of whether the two elements are adjacent in row or in column, they are referred to as adjacent elements.

Further, a concept of "shareable job" is further defined below: For jobs based on the same model, since they are different merely in mingled elements, two jobs with adjacent elements are referred to as adjacent shareable jobs.

A high-throughput computational material simulation optimization method based on a time prediction is provided. As shown in FIG. 1, the method includes the following steps.

In step 101, establishing a predictive model of a job configuration and a corresponding execution time. The step has following sub steps 1-1) to 1-3).

1-1) establishing a calculation database of a configuration of an executed job (i.e. four initial configuration documents required by VASP computation) in a high-throughput computational material simulation and a corresponding execution time, to manage all executed jobs collectively; the calculation database may include jobs that have been finished in various cases recently.

1-2) configuring all executed jobs in the calculation database established in sub step 1-1) as a training set, establishing a deep neural network, taking the configuration of the executed job, running parameters and a hardware configuration as inputs of the deep neural network and taking the execution time as an output, taking the executed jobs in the training set to perform a supervised learning to obtain a trained deep neural network model;

1-3) selecting some jobs as a testing set, and using the testing set to test the trained deep neural network obtained in sub step 1-2): if a difference between the execution time predicted by the deep neural network for each job in the testing set and an actual execution time of the job is within a preset error threshold, the trained deep neural network obtained in sub step 1-2) is taken as the predictive model: if there is an executed job for which the execution time predicted by the deep neural network has a difference with an actual execution time of the job exceeding the preset error threshold, generating and training more executed jobs to optimize and improve the deep neural network model and adding the new executed job and the corresponding execution time in the training set to obtain an updated training set, and returning the sub step 1-2) to use the updated training set to perform the supervised training on the deep neural network, until the difference between the execution time predicted by the deep neural network for each job in the testing set and an actual execution time of the job is within a preset error threshold (the preset error threshold is set to enable a relative difference between the predicted execution time and the actual execution time is less that 10%), and the trained deep neural network obtained in sub step 1-2) is taken as the predictive model; In step 102, predicting an execution time of each un-executed job under different cases using the predictive model. The step has following sub steps 2-1) to 2-2).

2-1) inputting all un-executed jobs in the high-throughput computational material simulation into the predictive model to output a prediction value of an independent execution time of each un-executed job;

2-2) for all L un-executed jobs based on a same material structure configuration in the high-throughput computational material simulation, using the predictive model to predict a sharing execution time of each of the L un-executed jobs in a situation of sharing execution information of other jobs in each of three sharing execution modes, recording a sharing execution mode having a shortest sharing execution time, and configuring the shortest sharing execution time as a final sharing execution time corresponding to the un-executed job to form a sharing execution time matrix $Q_{L \times L}$, and using a matrix $SH_{L \times L}$ to represent the corresponding sharing execution mode having the shortest sharing execution time: in a very special case, when all sharing execution modes are inferior to the independent execution mode, the execution mode is recorded as the independent execution mode.

In step 103, for all the L jobs, generating an optimization scheduling solution. The step has following sub steps 3-1) to 3-4).

3-1) representing a set of all un-executed jobs by S;

3-2) constructing a directed graph G=<V,E> based on the sharing execution time matrix $Q_{L \times L}$ and the set S, where V=S∪{r}, r represents a new added root node: for $q_{ij} \in Q_{L \times L}$, constructing an edge <i,j>∈E having a weight of $e_{ij}=q_{ij}$: for each job in S, constructing an edge starting from r and having a weight of the independent execution time of the job and adding the edge into E;

3-3) obtaining a minimum covering branch A by performing Edmonds algorithm on G;

3-4) traversing A based on a breadth-first search, and forming a set of parallelizable executing jobs $J_1, \ldots, J_k$, where k represents a depth of A and $S = \cup_{i=}^{k} J_i$, and generating the optimization scheduling solution: the job set $J_{i+1}$ on a next level is dependent on an execution result of the job set $J_k$ on a current level.

In step 104, executing all un-executed jobs based on the optimization scheduling solution, until all the un-executed jobs are executed. A specific principle is explained as follows.

4-1) in each model, when the jobs on a previous level are executed, all the jobs on a current level may be concurrently executed, without waiting for each other;

4-2) the sharing execution mode used by the shared execute jobs is decided by the previously generated matrix $S_{L \times L}$.

What is claimed is:

1. A high-throughput computational material simulation optimization method based on a time prediction, comprising:

establishing a predictive model of a job configuration and an execution time corresponding to the job configuration;

predicting an execution time of each un-executed job under different cases using the predictive model;

for each material structure configuration in the high-throughput computational material simulation, generating an optimization scheduling solution based on the execution time of each un-executed job; and executing all un-executed jobs based on the optimization scheduling solution in sequence, until all the un-executed jobs are executed, wherein the predicting the execution time of each un-executed job under different cases using the predictive model comprises:

inputting all un-executed jobs in the high-throughput computational material simulation into the predictive model to output a prediction value of an independent execution time of each un-executed job; and for all L un-executed jobs based on a same material structure configuration in the high-throughput computational material simulation, using the predictive model to predict a sharing execution time of each of the L un-executed jobs in a situation of sharing execution information of other jobs in each of different preset sharing execution modes, recording a sharing execution mode having a shortest sharing execution time, and configuring the shortest sharing execution time as a final sharing execution time corresponding to the un-executed job to form a sharing execution time matrix $Q_{L \times L}$, a matrix $SH_{L \times L}$ representing the sharing execution mode having the shortest sharing execution time, wherein executing all un-executed jobs based on the optimization scheduling solution in sequence, until all the un-executed jobs are executed, comprises:

when jobs on a previous level are executed, executing all jobs on a current level concurrently without waiting for each other; and deciding the sharing execution mode used by the un-executed jobs through the matrix $SH_{L \times L}$.

2. The method of claim 1, wherein the establishing the predictive model of the job configuration and the execution time corresponding to the job configuration comprises:

i) establishing a calculation database of an initial configuration of an executed job in the high-throughput computational material simulation and an execution time corresponding to the initial configuration;

ii) configuring all executed jobs in the calculation database as a training set, establishing a deep neural network, taking the initial configuration of the executed job, running parameters and a hardware configuration as inputs of the deep neural network and taking the execution time corresponding to the initial configuration as an output, taking the executed jobs in the training set to perform a supervised training to obtain a trained deep neural network model; and iii) selecting M jobs as a testing set, and using the testing set to test the trained deep neural network;

wherein if a difference between the execution time predicted by the deep neural network for each job in the testing set and an actual execution time of the job is within a preset error threshold, the trained deep neural network is taken as the predictive model;

if there is a job whose execution time predicted by the deep neural network has a difference with an actual execution time of the job exceeding the preset error threshold, a new executed job in the training set is added to obtain an updated training set, and the step ii) is returned to use the updated training set to perform the supervised training on the deep neural network.

3. The method of claim 1, wherein the generating the optimization scheduling solution comprises:

representing a set of all un-executed jobs based on the same material structure configuration by S;

constructing a directed graph $G=<V,E>$ based on the sharing execution time matrix $Q_{L \times L}$ and the set S, where $V=S \cup \{r\}$, r represents a new added root node, and V represents a set of all nodes in the directed graph G; for $q_{ij} \in Q_{L \times L}$, constructing an edge $<i> \in E$ having a weight of $e_{ij}=q_{ij}$; for each job in S, constructing an edge starting from r and having a weight of the independent execution time of the job, and adding the edge into E, where E represents a set of all edges in the directed graph G, q represents an element in the sharing execution time matrix $Q_{L \times L}$, and e represents a weight of an edge between a node i and a node j;

obtaining a minimum covering branch A by performing Edmonds algorithm on G; and traversing A based on a breadth-first search, and forming a set of parallelizable executing jobs $J_1, \ldots, J_k$, where k represents a depth of A and $S = \cup_{i=1}^{k} J_i$, and generating the optimization scheduling solution for all the L jobs, and J represents the set of parallelizable executing jobs.

4. The method of claim 1, wherein the different preset sharing execution modes comprise: a sharing CONTCAR (continuation card) execution mode, a sharing CHGCAR (charge carrier) execution mode, a sharing CONTCAR and CHGCAR execution mode;

wherein in the sharing CONTCAR execution mode, an un-executed job is executed by replacing an original POSCAR (position card) of the un-executed job with CONTCAR obtained in an executed job;

in the sharing CHGCAR execution mode, an un-executed job takes CHGCAR outputted by an executed job as an additional input document to obtain a charge distribution, and an original INCAR (input cardinal) of the un-executed job is modified by setting ICHARG as 1, wherein the ICHARG is a parameter in the INCAR, and setting the ICHARG as 1 represents that the un-executed job reads the CHGCAR outputted by an executed job;

in the sharing CONTCAR and CHGCAR execution mode, an un-executed job is executed by replacing an original POSCAR of the un-executed job with CONTCAR obtained in an executed job, and the un-executed job takes CHGCAR outputted by an executed job as an additional input document to obtain a charge distribution, and an original INCAR of the un-executed job is modified by setting ICHARG as 1.

5. A high-throughput computational material simulation optimization apparatus based on a time prediction, comprising:

a processor;

a memory having executable instructions stored therein, wherein when the instructions are executed by the processor, the processor is caused to perform the high-throughput computational material simulation optimization method based on a time prediction comprising:

establishing a predictive model of a job configuration and an execution time corresponding to the job configuration;

predicting an execution time of each un-executed job under different cases using the predictive model;

for each material structure configuration in the high-throughput computational material simulation, generating an optimization scheduling solution based on the execution time of each un-executed job; and executing all un-executed jobs based on the optimization scheduling solution in sequence, until all the un-executed jobs are executed, wherein the predicting the execution time of each un-executed job under different cases using the predictive model comprises:

inputting all un-executed jobs in the high-throughput computational material simulation into the predictive model to output a prediction value of an independent execution time of each un-executed job; and for all L un-executed jobs based on a same material structure configuration in the high-throughput computational material simulation, using the predictive model to predict a sharing execution time of each of the L un-executed jobs in a situation of sharing execution information of other jobs in each of different preset sharing execution modes, recording a sharing execution mode having a shortest sharing execution time, and configuring the shortest sharing execution time as a final sharing execution time corresponding to the un-executed job to form a sharing execution time matrix $Q_{L \times L}$, a matrix $SH_{L \times L}$ representing the sharing execution mode having the shortest sharing execution time, wherein executing all un-executed jobs based on the optimization scheduling solution in sequence, until all the un-executed jobs are executed, comprises:

when jobs on a previous level are executed, executing all jobs on a current level concurrently without waiting for each other; and deciding the sharing execution mode used by the un-executed jobs through the matrix $SH_{L \times L}$.

6. The apparatus of claim 5, wherein the establishing the predictive model of the job configuration and the execution time corresponding to the job configuration comprises:

i) establishing a calculation database of an initial configuration of an executed job in the high-throughput computational material simulation and an execution time corresponding to the initial configuration;

ii) configuring all executed jobs in the calculation database as a training set, establishing a deep neural network, taking the initial configuration of the executed job, running parameters and a hardware configuration as inputs of the deep neural network and taking the execution time corresponding to the initial configuration as an output, taking the executed jobs in the training set to perform a supervised training to obtain a trained deep neural network model; and iii) selecting M jobs as a testing set, and using the testing set to test the trained deep neural network;

wherein if a difference between the execution time predicted by the deep neural network for each job in the testing set and an actual execution time of the job is within a preset error threshold, the trained deep neural network is taken as the predictive model;

if there is a job whose execution time predicted by the deep neural network has a difference with an actual execution time of the job exceeding the preset error threshold, a new executed job in the training set is added to obtain an updated training set, and the step ii) is returned to use the updated training set to perform the supervised training on the deep neural network.

7. The apparatus of claim 5, wherein the generating the optimization scheduling solution comprises:

representing a set of all un-executed jobs based on the same material structure configuration by S;

constructing a directed graph G=<V,E> based on the sharing execution time matrix $Q_{L \times L}$ and the set S, where V=S∪{r}, r represents a new added root node, and V represents a set of all nodes in the directed graph G; for $q_{ij} \in Q_{L \times L}$, constructing an edge <i,j>∈E having a weight of $e_{ij}=q_{ij}$; for each job in S, constructing an edge starting from r and having a weight of the independent execution time of the job, and adding the edge into E, where E represents a set of all edges in the directed graph G, q represents an element in the sharing execution time matrix $Q_{L \times L}$, and e represents a weight of an edge between a node i and a node j;

obtaining a minimum covering branch A by performing Edmonds algorithm on G; and traversing A based on a breadth-first search, and forming a set of parallelizable executing jobs $J_1, \ldots, J_k$, where k represents a depth of A and $S=\cup_{i=1}^{k}J_i$, and generating the optimization scheduling solution for all the L jobs, and J represents the set of parallelizable executing jobs.

8. The apparatus of claim 5, wherein the different preset sharing execution modes comprise: a sharing CONTCAR (continuation card) execution mode, a sharing CHGCAR (charge carrier) execution mode, a sharing CONTCAR and CHGCAR execution mode;

wherein in the sharing CONTCAR execution mode, an un-executed job is executed by replacing an original POSCAR (position card) of the un-executed job with CONTCAR obtained in an executed job;

in the sharing CHGCAR execution mode, an un-executed job takes CHGCAR outputted by an executed job as an additional input document to obtain a charge distribution, and an original INCAR (input cardinal) of the un-executed job is modified by setting ICHARG as 1, wherein the ICHARG is a parameter in the INCAR, and setting the ICHARG as 1 represents that the un-executed job reads the CHGCAR outputted by an executed job;

in the sharing CONTCAR and CHGCAR execution mode, an un-executed job is executed by replacing an original POSCAR of the un-executed job with CONTCAR obtained in an executed job, and the un-executed job takes CHGCAR outputted by an executed job as an additional input document to obtain a charge distribution, and an original INCAR of the un-executed job is modified by setting ICHARG as 1.

9. A non-transient storage medium having instructions stored therein, wherein when the instructions are executed by a processor, the processor is caused to perform the high-throughput computational material simulation optimization method based on a time prediction comprising:

establishing a predictive model of a job configuration and an execution time corresponding to the job configuration;

predicting an execution time of each un-executed job under different cases using the predictive model;

for each material structure configuration in the high-throughput computational material simulation, generating an optimization scheduling solution based on the execution time of each un-executed job; and executing all un-executed jobs based on the optimization scheduling solution in sequence, until all the un-executed jobs are executed, wherein the predicting the execution time of each un-executed job under different cases using the predictive model comprises:

inputting all un-executed jobs in the high-throughput computational material simulation into the predictive model to output a prediction value of an independent execution time of each un-executed job; and for all L un-executed jobs based on a same material structure configuration in the high-throughput computational material simulation, using the predictive model to predict a sharing execution time of each of the L un-executed jobs in a situation of sharing execution information of other jobs in each of different preset sharing execution modes, recording a sharing execution mode having a shortest sharing execution time, and configuring the shortest sharing execution time as a final sharing execution time corresponding to the un-executed job to form a sharing execution time matrix $Q_{L \times L}$, a matrix $SH_{L \times L}$ representing the sharing execution mode having the shortest sharing execution time, wherein executing all un-executed jobs based on the optimization scheduling solution in sequence, until all the un-executed jobs are executed, comprises:

when jobs on a previous level are executed, executing all jobs on a current level concurrently without waiting for each other; and deciding the sharing execution mode used by the un-executed jobs through the matrix $SH_{L \times L}$.

10. The non-transient storage medium of claim 9, wherein the establishing the predictive model of the job configuration and the execution time corresponding to the job configuration comprises:
  i) establishing a calculation database of an initial configuration of an executed job in the high-throughput computational material simulation and an execution time corresponding to the initial configuration;
  ii) configuring all executed jobs in the calculation database as a training set, establishing a deep neural network, taking the initial configuration of the executed job, running parameters and a hardware configuration as inputs of the deep neural network and taking the execution time corresponding to the initial configuration as an output, taking the executed jobs in the training set to perform a supervised training to obtain a trained deep neural network model; and
  iii) selecting M jobs as a testing set, and using the testing set to test the trained deep neural network;
  wherein if a difference between the execution time predicted by the deep neural network for each job in the testing set and an actual execution time of the job is within a preset error threshold, the trained deep neural network is taken as the predictive model;
  if there is a job whose execution time predicted by the deep neural network has a difference with an actual execution time of the job exceeding the preset error threshold, and adding a new executed job in the training set to obtain an updated training set, and returning the step ii) to use the updated training set to perform the supervised training on the deep neural network.

11. The non-transient storage medium of claim 9, wherein the generating the optimization scheduling solution comprises:
  representing a set of all un-executed jobs based on the same material structure configuration by S;
  constructing a directed graph G=<V,E> based on the sharing execution time matrix $Q_{L \times L}$ and the set S, where V=S∪{r}, r represents a new added root node, and V represents a set of all nodes in the directed graph G; for $q_{ij} \in Q_{L \times L}$, constructing an edge <i,j>∈E having a weight of $e_{ij}=q_{ij}$; for each job in S, constructing an edge starting from r and having a weight of the independent execution time of the job, and adding the edge into E, where E represents a set of all edges in the directed graph G, q represents an element in the sharing execution time matrix $Q_{L \times L}$, and e represents a weight of an edge between a node i and a node j;
  obtaining a minimum covering branch A by performing Edmonds algorithm on G; and
  traversing A based on a breadth-first search, and forming a set of parallelizable executing jobs $J_1, \ldots, J_k$, where k represents a depth of A and $S=\cup_{i=}^{k} J_i$, and generating the optimization scheduling solution for all the L jobs, and J represents the set of parallelizable executing jobs.

12. The non-transient storage medium of claim 9, wherein the different preset sharing execution modes comprise: a sharing CONTCAR (continuation card) execution mode, a sharing CHGCAR (charge carrier) execution mode, a sharing CONTCAR and CHGCAR execution mode;
  wherein in the sharing CONTCAR execution mode, an un-executed job is executed by replacing an original POSCAR (position card) of the un-executed job with CONTCAR obtained in an executed job;
  in the sharing CHGCAR execution mode, an un-executed job takes CHGCAR outputted by an executed job as an additional input document to obtain a charge distribution, and an original INCAR (input cardinal) of the un-executed job is modified by setting ICHARG as 1, wherein the ICHARG is a parameter in the INCAR, and setting the ICHARG as 1 represents that the un-executed job reads the CHGCAR outputted by an executed job;
  in the sharing CONTCAR and CHGCAR execution mode, an un-executed job is executed by replacing an original POSCAR of the un-executed job with CONTCAR obtained in an executed job, and the un-executed job takes CHGCAR outputted by an executed job as an additional input document to obtain a charge distribution, and an original INCAR of the un-executed job is modified by setting ICHARG as 1.

* * * * *

UNITED STATES PATENT AND TRADEMARK OFFICE
CERTIFICATE OF CORRECTION

| | | |
|---|---|---|
| PATENT NO. | : 12,204,830 B2 | Page 1 of 1 |
| APPLICATION NO. | : 17/143513 | |
| DATED | : January 21, 2025 | |
| INVENTOR(S) | : Zhihui Du and Chongyu Wang | |

It is certified that error appears in the above-identified patent and that said Letters Patent is hereby corrected as shown below:

On the Title Page

Item (54) and in the Specification Column 1, Lines 1-3, should read:
--HIGH-THROUGHPUT COMPUTATIONAL MATERIAL SIMULATION OPTIMISATION METHOD AND APPARATUS BASED ON TIME PREDICTION--

Signed and Sealed this
First Day of April, 2025

Coke Morgan Stewart
*Acting Director of the United States Patent and Trademark Office*